(12) United States Patent  (10) Patent No.: US 7,706,080 B2
Ohtake et al.  (45) Date of Patent: Apr. 27, 2010

(54) ZOOM LENS AND IMAGE-PICKUP APPARATUS

(75) Inventors: Motoyuki Ohtake, Saitama (JP); Shinichi Arita, Tokyo (JP)

(73) Assignee: Sony Corporation, Tokyo (JP)

( * ) Notice: Subject to any disclaimer, the term of this patent is extended or adjusted under 35 U.S.C. 154(b) by 810 days.

(21) Appl. No.: 10/589,675

(22) PCT Filed: Oct. 4, 2005

(86) PCT No.: PCT/JP2005/018343

§ 371 (c)(1),
(2), (4) Date: Aug. 16, 2006

(87) PCT Pub. No.: WO2006/067905

PCT Pub. Date: Jun. 29, 2006

(65) Prior Publication Data

US 2009/0109545 A1  Apr. 30, 2009

(30) Foreign Application Priority Data

Dec. 21, 2004 (JP) .............................. 2004-369632

(51) Int. Cl.
*G02B 15/14* (2006.01)
(52) U.S. Cl. .................... 359/687; 359/686; 348/240.3; 348/335
(58) Field of Classification Search ................. 359/676, 359/686, 687
See application file for complete search history.

(56) References Cited

U.S. PATENT DOCUMENTS 6,400,515 B1 * 6/2002 Kohno ........................ 359/675

(Continued)

FOREIGN PATENT DOCUMENTS

JP      08-160299 A    6/1996

(Continued)

OTHER PUBLICATIONS

Australian Patent Office (Written Opinion); Application No. SG 200604960-5; Dated Oct. 4, 2005.

(Continued)

*Primary Examiner*—Darryl J Collins
(74) *Attorney, Agent, or Firm*—Rader, Fishman & Grauer PLLC

(57) ABSTRACT

To provide a zoom lens capable of achieving stable optical quality by inhibiting an effect of assemble errors during manufacturing. A zoom lens includes a positive first lens group G1, a negative second lens group G2, a positive third lens group G3, and a positive fourth lens group G4, which are arranged from an object side in that order, and during variation in lens position from a wide angle end state to a telescopic end state, G1 and G3 are fixed, G2 is moved toward an image side, G4 moves so as to compensate fluctuations in image-surface position due to the shift of G2, and an aperture diaphragm S is fixed adjacent to the object side of G3, etc. G2 includes a negative meniscus lens L21 with a concave surface opposing the image side and a cemented lens L22 of a biconcave lens and a positive lens with a convex surface opposing the object side, which are arranged from the object side in that order, and the negative meniscus lens is a compound lens of a glass lens and a resin lens PL formed adjacent to the image side of the glass lens, the lens surface adjacent to the image side of the resin lens is aspheric, and the conditional equation (1) below is satisfied:

$$n2 > 1.75, \qquad (1)$$

where n2 is the average refractive index of glass constituting G2.

6 Claims, 14 Drawing Sheets

U.S. PATENT DOCUMENTS

| | | |
|---|---|---|
| 6,433,938 B1 | 8/2002 | Kawamura et al. |
| 6,710,932 B2 * | 3/2004 | Kitaoka et al. ............... 359/686 |
| 6,741,399 B2 * | 5/2004 | Ori ........................... 359/687 |
| 2003/0151829 A1 | 8/2003 | Ori |

FOREIGN PATENT DOCUMENTS

| | | |
|---|---|---|
| JP | 11-052236 A | 2/1999 |
| JP | 2000-221395 A | 8/2000 |
| JP | 2002-036554 A | 2/2002 |
| JP | 2003-295055 | 10/2003 |
| JP | 2003-295055 A | 10/2003 |

OTHER PUBLICATIONS

Supplemental European Search Report and Opinion dated Jun. 5, 2008 for corresponding European Application No. 05 79 0525.
Notification of Transmittal of Translation of International Preliminary Report on Patentability dated Jul. 5, 2007.
International Preliminary Report on Patentablity dated Jun. 26, 2007.
Translation of Written Opinon of the International Searching Authority.
PCT International Search Report for PCT/JP2005/018343 mailed on Dec. 27, 2005.

* cited by examiner

ZOOM LENS AND IMAGE-PICKUP APPARATUS

TECHNICAL FIELD

The present invention relates to new zoom lenses and image-pickup apparatuses, and in detail relates to a zoom lens suitable for cameras photo-detecting with an image-pickup element, such as a video camera and a digital still camera, and an image-pickup apparatus using the zoom lens.

BACKGROUND ART

A recording method has been known in that the luminous power of an object image formed on a surface of an image-pickup element by the image-pickup element using a photo-electric transducer, such as a CCD (charge coupled device) and a CMOS (complementary metal-oxide semiconductor), is converted into an electric output by the photoelectric transducer so as to record it.

Along with the recent technological progress in micro-fabrication technique, a central processing unit (CPU) is speeded up and memory media are highly integrated, so that high-capacity image data, which have been difficult to handle, have got to be processed at high-speed. Also, light-receiving elements are highly integrated and miniaturized, so that the recording at high spatial frequency is enabled due to the high-integration and the entire camera is miniaturized due to the miniaturization.

However, a problem has arisen in that the light-receiving area of the individual photoelectric transducer is reduced due to the high-integration and the miniaturization, so that the noise effect is increased along with the reduction in electric output. For preventing this, there have been approaches to the increase in luminous power arriving on the light-receiving element by increasing an aperture ratio of an optical system and to the arrangement of a micro-lens element (so-called micro-lens array) adjacent to each element. The micro-lens array limits the exit pupil position of the lens system, although it guides the luminous flux passing between elements adjacent to each other to the element. That is, when the exit pupil position of the lens system comes close to the light-receiving element, the angle of the principal beam arriving at the light-receiving element defined by the optical axis is increased so that the angle of the off-axial luminous flux toward the picture periphery to the optical axis is further increased so as not to arrive on the light-receiving element, resulting in luminous power shortage.

Various inventions have been disclosed about zoom lenses suitable for cameras for recording object images via the above-mentioned photoelectric transducer.

For example, a mainstream zoom lens for a video camera includes a so-called PNPP four-lens group composed of a positive lens group, a negative lens group, a positive lens group, and a positive lens group arranged from the object side in that order. In particular, a zoom type has been mainly used in that during variations, the first and third lens groups are fixed in the optical axial direction; the second lens group functions as a variator; and the fourth lens group functions as a compensator.

Along with recent high-integration of the light-receiving elements, the lens system has been miniaturized and advanced in capabilities. For this end, it is especially essential to preferably correct variations due to aberrations accompanied by lens variations in position.

In the PNPP four-zoom lens group mentioned above, since only one lens group having negative refracting power exists, the negative distortion has been difficult to be corrected at the wide-angle end. As the variator is only the second lens group, the refracting power has been difficult to be reduced for obtaining a predetermined variable power ratio, so that the negative distortion needs to be corrected with the other lens groups. As a result, the third lens group has been composed of a positive partial group and a negative partial group so that the negative distortion being liable to be generated at the wide angle end is preferably corrected and simultaneously the third lens group is constructed to have strong positive refracting power for astringing the luminous flux exhaled from the second lens group.

It is generally known that use of an aspheric lens be effective for compatibility between the miniaturization and the offering high-performance. In the second lens group serving as a variator, with high refracting power, the displacement required for a predetermined variable power ratio is reduced, so that the entire lens length can be reduced. The aberrations generated when the refracting power is increased have been corrected by adopting an aspheric surface.

In the PNPP four-zoom lens group mentioned above, it is known that inventions specifically adopting the aspheric lens to the second lens group include Japanese Unexamined Patent Application Publications No. 08-160299, No. 11-52236, and No. 2002-36554.

In the sixth embodiment of Japanese Unexamined Patent Application Publications No. 08-160299, the second lens group is composed of a biconcave lens and a biconvex lens, and the surface adjacent to the image side of the biconcave lens arranged nearest to the object is aspheric. In the fourth and fifth embodiments of Japanese Unexamined Patent Application Publication No. 11-52236, the second lens group is composed of two negative lenses, and the surface adjacent to the image side of the negative meniscus lens arranged nearest to the object is aspheric. In Japanese Unexamined Patent Application Publication No. 2002-36554, the second lens group is composed of a negative meniscus lens and a cemented lens of a biconcave lens and a positive lens, and the surface adjacent to the image side of the biconvex lens is aspheric.

However, in the second lens group serving as a variator, the off-axial luminous flux passes through off the optical axis at the wide angle end while the on-axial luminous flux passes through in a spreading state at the telescopic end, so that the eccentric coma is liable to develop even by the micro-eccentricity produced during manufacturing, resulting in a problem of the optical quality deterioration.

Hence, as in Japanese Unexamined Patent Application Publication No. 08-160299, when the convex lens surface of the lens arranged nearest to the object of the second lens group opposes an aperture diaphragm, the eccentric coma is liable to develop in the picture periphery at the wide angle end by the micro-eccentricity produced during manufacturing, and because of three single lenses, the eccentric coma is liable to develop in the picture center at the telescopic end by the micro-eccentricity produced during manufacturing, resulting in the difficulty in maintaining predetermined optical quality.

In the zoom lens disclosed in Japanese Unexamined Patent Application Publication No. 11-52236, because a diffraction optical element is included, although the number of lenses is small, the diffraction has been changed by the micro-eccentricity produced during manufacturing, so that the correction state of aberrations is varied, resulting in a problem of the difficulty in obtaining a predetermined optical performance. Hence, a barrel structure and an adjustment method in those the eccentricity produced during manufacturing is suppressed as much as possible are required, so that the barrel structure and the adjustment operation have been complicated, resulting in a high increase in cost.

In the zoom lens disclosed in Japanese Unexamined Patent Application Publication No. 2002-36554, because the convex lens surface arranged adjacent to the object of the biconcave lens having an aspheric surface opposes the aperture diaphragm, the coma due to the eccentricity and developed in the picture periphery is largely varied, so that the optical quality has been deteriorated due to the slight assemble error during manufacturing, resulting in a problem of the difficulty in obtaining stable optical quality.

The present invention solves the problems described above and it is an object thereof to provide a zoom lens and an image-pickup apparatus using the zoom lens capable of achieving stable optical quality by inhibiting an effect of assemble errors during manufacturing.

DISCLOSURE OF INVENTION

In order to solve the problems described above, a zoom lens according to the present invention includes a first lens group having positive refracting power; a second lens group having negative refracting power; a third lens group having positive refracting power; and a fourth lens group having positive refracting power, which are arranged from an object side in that order, and during variation in lens position from a wide angle end state to a telescopic end state, the first and third lens groups are fixed at predetermined positions along the optical axis, the second lens group is moved toward an image side, and the fourth lens group moves so as to compensate fluctuations in image-surface position due to the shift of the second lens group, and an aperture diaphragm is arranged adjacent to the object side of the third lens group or within the third lens group, and is fixed in the optical axial direction during the variation in lens position, and the second lens group includes a negative meniscus lens with a concave surface opposing the image side and a cemented lens of a biconcave lens and a positive lens with a convex surface opposing the object side, which are arranged from the object side in that order, and the negative meniscus lens is made of a compound lens of a glass lens and a resin lens formed adjacent to the image side of the glass lens, the lens surface adjacent to the image side of the resin lens being aspheric, and the following conditional equation (1) is satisfied:

$$n2 > 1.75, \tag{1}$$

where n2 is the average refractive index of glass lenses constituting the second lens group with respect to d ray.

In order to solve the problems described above, an image-pickup apparatus according to the present invention includes a zoom lens and an image-pickup element for converting optical images formed by the zoom lens into electric signals, and the zoom lens includes a first lens group having positive refracting power; a second lens group having negative refracting power; a third lens group having positive refracting power; and a fourth lens group having positive refracting power, which are arranged from an object side in that order, and during variation in lens position from a wide angle end state to a telescopic end state, the first and third lens groups are fixed at predetermined positions along the optical axis, the second lens group is moved toward an image side, and the fourth lens group moves so as to compensate fluctuations in image-surface position due to the shift of the second lens group, and an aperture diaphragm is arranged adjacent to the object side of the third lens group or within the third lens group, and is fixed in the optical axial direction during the variation in lens position, and the second lens group includes a negative meniscus lens with a concave surface opposing the image side and a cemented lens of a biconcave lens and a positive lens with a convex surface opposing the object side, which are arranged from the object side in that order, and the negative meniscus lens is made of a compound lens of a glass lens and a resin lens formed adjacent to the image side of the glass lens, the lens surface adjacent to the image side of the resin lens being aspheric, and the following conditional equation (1) is satisfied:

$$n2 > 1.75, \tag{1}$$

where n2 is the average refractive index of glass lenses constituting the second lens group with respect to d ray.

Therefore, according to the present invention, the thickness of the second lens group is reduced so that compatibility between the miniaturization and the offering high-performance is possible.

A zoom lens according to the present invention includes a first lens group having positive refracting power; a second lens group having negative refracting power; a third lens group having positive refracting power; and a fourth lens group having positive refracting power, which are arranged from an object side in that order, and during variation in lens position from a wide angle end state to a telescopic end state, the first and third lens groups are fixed at predetermined positions along the optical axis, the second lens group is moved toward an image side, and the fourth lens group moves so as to compensate fluctuations in image-surface position due to the shift of the second lens group, and an aperture diaphragm is arranged adjacent to the object side of the third lens group or within the third lens group, and is fixed in the optical axial direction during the variation in lens position, and the second lens group includes a negative meniscus lens with a concave surface opposing the image side and a cemented lens of a biconcave lens and a positive lens with a convex surface opposing the object side, which are arranged from the object side in that order, and the negative meniscus lens is made of a compound lens of a glass lens and a resin lens formed adjacent to the image side of the glass lens, the lens surface adjacent to the image side of the resin lens being aspheric, and the following conditional equation (1) is satisfied:

$$n2 > 1.75, \tag{1}$$

where n2 is the average refractive index of glass lenses constituting the second lens group with respect to d ray.

Also, an image-pickup apparatus according to the present invention includes a zoom lens and an image-pickup element for converting optical images formed by the zoom lens into electric signals, and the zoom lens includes a first lens group having positive refracting power; a second lens group having negative refracting power; a third lens group having positive refracting power; and a fourth lens group having positive refracting power, which are-arranged from an object side in that order, and during variation in lens position from a wide angle end state to a telescopic end state, the first and third lens groups are fixed at predetermined positions along the optical axis, the second lens group is moved toward an image side, and the fourth lens group moves so as to compensate fluctuations in image-surface position due to the shift of the second lens group, and an aperture diaphragm is arranged adjacent to the object side of the third lens group or within the third lens group, and is fixed in the optical axial direction during the variation in lens position, and the second lens group includes a negative meniscus lens with a concave surface opposing the image side and a cemented lens of a biconcave lens and a positive lens with a convex surface opposing the object side, which are arranged from the object side in that order, and the negative meniscus lens is made of a compound lens of a glass lens and a resin lens formed adjacent to the image side of the glass lens, the lens surface adjacent to the image side of the resin lens being aspheric, and the following conditional equation (1) is satisfied:

$$n2>1.75, \quad (1)$$

where n2 is the average refractive index of glass lenses constituting the second lens group with respect to d ray.

Therefore, in the zoom lens according to the present invention, the thickness of the second lens group is reduced so that compatibility between the miniaturization and the offering high-performance is possible. The image-pickup apparatus according to the present invention can be miniaturized while high-quality images can be obtained by using the zoom lens according to the present invention.

In the invention described, the conditional equation (2) is satisfied:

$$0.25 < Rs/Da < 0.45, \quad (2)$$

where Rs is the radius of curvature of the lens surface nearest to the image side of the meniscus lens in the second lens group and Da is the distance from the lens surface Rs in the wide angle end state to the aperture diaphragm. Thereby, the change in coma generated corresponding to the change in angle of view in the wide angle end state may be preferably corrected.

In the invention described, the conditional equation (3) is satisfied:

$$0.7<(R1-R2)/(R1+R2)<0.9, \quad (3)$$

where R1 is the radius of curvature of the lens surface nearest to the object side of the negative meniscus lens arranged in the second lens group and R2 is the radius of curvature of the lens surface adjacent to the image side of glass lenses constituting the negative meniscus lens arranged in the second lens group. Thereby, an effect of assemble errors during manufacturing may be suppressed so as to achieve stable optical quality while the lens system may be further miniaturized.

In the invention described, the conditional equation (4) is satisfied:

$$0.3<|f2|/(fw \cdot ft)^{1/2}<0.4, \quad (4)$$

where f2 is the focal length of the second lens group; fw is the focal length of the entire lens system in the wide angle end state; and ft is the focal length of the entire lens system in the telescopic end state. Hence, the change in off-axial aberration due to the change in lens position may be preferably corrected.

BEST MODE FOR CARRYING OUT THE INVENTION

Figure 1:
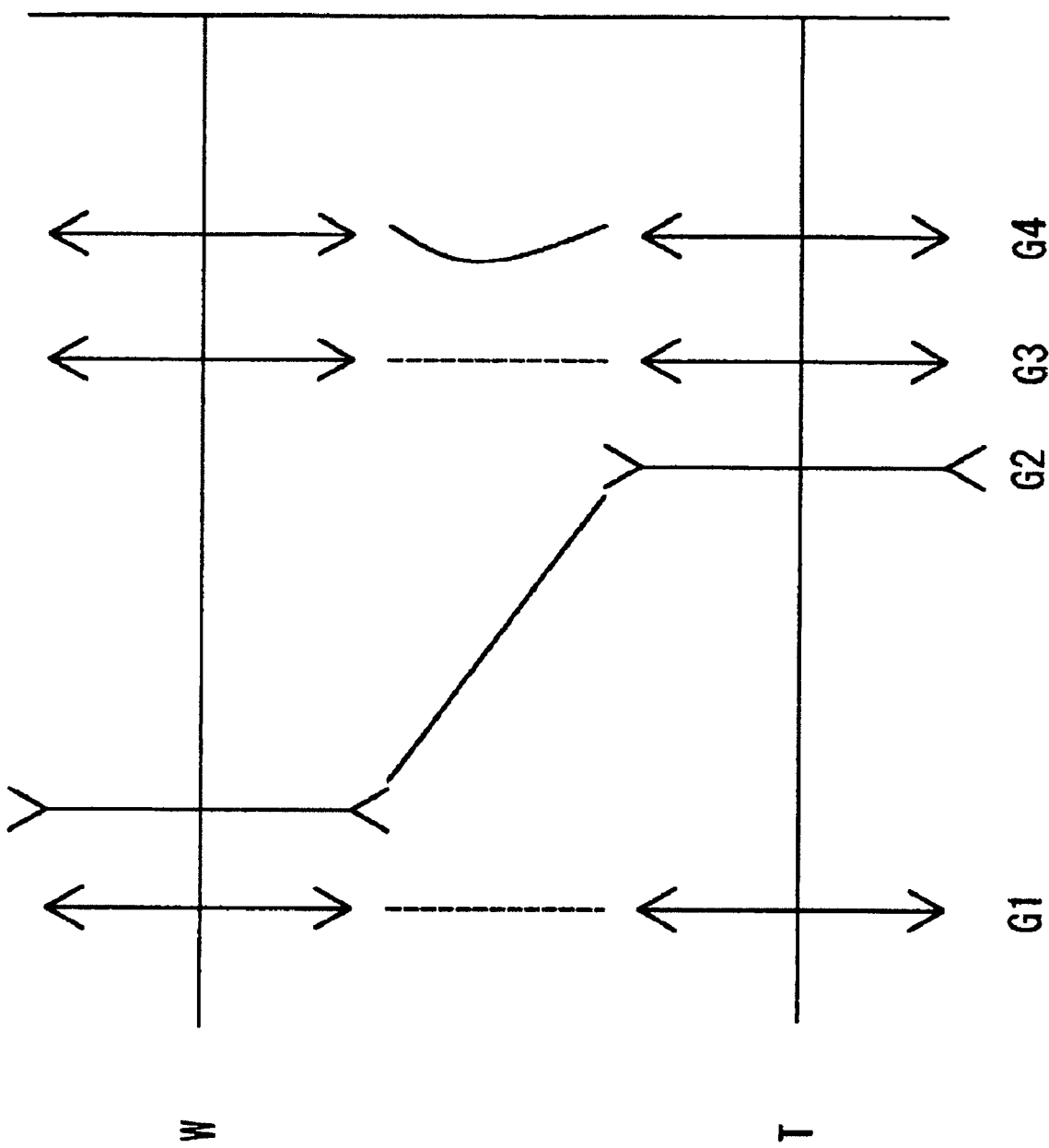
FIG. 1 is a drawing showing refractive power arrangements of each embodiment of a zoom lens according to the present invention also showing whether each lens group is movable or immovable.

The best mode for carrying out a zoom lens and an image-pickup apparatus according to the present invention will be described below with reference to the attached drawings.

A zoom lens according to the present invention is composed of a first lens group having positive refracting power, a second lens group having negative refracting power, a third lens group having positive refracting power, and a fourth lens group having positive refracting power arranged from the object side in that order. During the variation from the wide angle end state with the shortest focal length to the telescopic end state with the longest focal length, the first and third lens groups are fixed at predetermined positions along the optical axis; the second lens group is moved toward the image side; and the fourth lens group moves so as to compensate the fluctuation in image-surface position due to the shift of the second lens group.

The aperture diaphragm is arranged adjacent to the object side of the third lens group or within the third lens group.

On the basis of the structure described above, in the zoom lens according to the present invention, the second lens group is composed of a negative meniscus lens with a concave surface opposing the image side and a cemented lens of a biconcave lens and a positive lens with a convex surface opposing the object side, which are arranged from the object side in that order. The negative meniscus lens is made of a compound lens of a glass lens and a resin lens formed adjacent to the image side of the glass lens, and the lens surface adjacent to the image side of the resin lens is to be aspheric, so that the miniaturization and the offering high-performance can be compatible and an effect of assemble errors during manufacturing is suppressed so as to achieve stable optical quality.

In the PNPP four-zoom lens group, changes in off-axial aberrations generated during the variation from the wide angle end state to the telescopic end state have been essential to be preferably corrected.

For correcting such changes, it is effective to positively change the height of an off-axial luminous flux in accordance with the change in lens position. In particular, by respectively arranging one or more movable lens groups at positions adjacent to the object and image sides of the aperture diaphragm, the above-mentioned changes can be preferably corrected.

In the zoom lens according to the present invention, by arranging the aperture diaphragm adjacent to the object side of the third lens group or within the third lens group, the movable second lens group is arranged adjacent to the object side of the aperture diaphragm while the movable fourth lens group is arranged adjacent to the image side of the aperture diaphragm, so that changes in off-axial aberrations generated in accordance with the change in lens position are preferably corrected.

Since there is only a second lens group in a conventional PNPP four-zoom lens group where a lens group has negative refracting power, so that the miniaturization and the offering high-performance of the optical system have been difficult to be compatible.

The miniaturization of the optical system is generally split into the reduction in total lens length and the reduction in lens diameter of the first lens group, which has a large lens diameter because it is arranged away from the aperture diaphragm. Since a size is a volume, the reduction in lens diameter contributes to the miniaturization much more than the reduction in total lens length does thereto because the reduction in lens diameter contributes to the reduction in both height and width.

For reducing the lens diameter of the first lens group, it is necessary to move the height of the off-axial luminous flux passing through the first and second lens groups closer to the optical axis. However, for correcting the off-axial aberrations generated during the variation from the wide angle end state to the telescopic end state, it is essential to positively change the height of the off-axial luminous flux passing through each lens group, so that compatibility between the miniaturization and the offering high-performance has been difficult.

For reducing the lens diameter of the first lens group, it is preferable that the luminous flux passing through the first lens group in the wide angle end state pass through a position close to the optical axis. To this end, it is preferable to correct the off-axial aberration in the second lens group; however, as mentioned above, when the off-axial luminous flux passing through the second lens group is moved closer to the optical axis for miniaturization, the change in coma generated corresponding to the change in angle of view has been difficult to be corrected preferably.

Whereas, in the zoom lens according to the present invention, by reducing the thickness of the entire second lens group, the diameter is reduced. Specifically, the second lens group is composed of a negative meniscus lens and a cemented lens of a biconcave lens and a positive lens with a convex surface opposing the object side, which is arranged adjacent to the image side of the negative meniscus lens with an air space therebetween. By making each lens constituting the second lens group of a glass material with a high refractive index, the radii of curvature of the image side lens surface of the negative meniscus lens and the object side lens surface of the biconcave lens can be increased, thereby reducing the air apace between the negative meniscus lens and the biconcave lens so as to reduce the thickness of the second lens group.

In addition, the negative meniscus lens is made of a compound lens of a meniscus glass lens and a thin resin lens closely formed on the image side lens surface of the meniscus glass lens, and the image side lens surface of the resin lens is aspheric.

Recently, the molding has been the mainstream of the aspheric glass lens surface fabrication; however, since the shape of the raw material before molding is close to a sphere, although the molding is suitable for fabricating the biconvex lens, it is not suitable for fabricating the negative lens. In particular, in the meniscus negative lens like in the second lens group, both the centers of the object side lens surface and the image side lens surface are positioned close to the image side further from the lens position, so that imbalanced stresses are applied during cooling directly after the molding, and a fracture is liable to be generated. Therefore, the limits of the lens shape, such as the increase in central thickness and the reduction in thickness difference between the central thickness and the peripheral thickness, are imposed, so that the reduction in lens diameter and the offering the high-performance have been not sufficiently obtained.

By the way, a compound lens has been known in that a resin lens is closely formed on a glass lens. In the aspheric surface fabrication technique frequently used for a concave lens, which is difficult to be molded, a problem has been arisen in that the mold releasing is deteriorated during the molding of the resin lens on a concave surface with a small radius of curvature, so that surface accuracies are deteriorated due to a stress applied to the resin lens surface.

Whereas, in the zoom lens according to the present invention, as described above, by making each glass lens, constituting the second lens group, from a glass material with a high refractive index, the radius of curvature of the image side lens surface of the negative meniscus lens can be increased; and by forming a thin resin lens surface on the glass lens surface with the increased radius of curvature, the releasing during the molding of the resin lens is improved so that preferable surface accuracies of the resin lens are maintained, thereby enabling changes in aberrations generated corresponding to the miniaturization to be preferably corrected.

Also, since the negative meniscus lens is mostly separated from the aperture diaphragm in the second lens group, the on-axial luminous flux passes through away from the off-axial luminous flux. Hence, the change in coma, which is liable to be generated in the wide angle end state corresponding to the change in angle of view can be corrected preferably.

By the structure described above, the zoom lens according to the present invention has achieved the compatibility between the miniaturization and the offering high-performance.

In the zoom lens according to the present invention, the following conditional equation (1) is satisfied:

$$n2 > 1.75, \quad (1)$$

where n2 is the average refractive index of glass lenses constituting the second lens group with respect to d ray.

In addition, n2 is calculated by the equation below:

$$n2 = (n21 + n22 + n23)/3,$$

where n21 is the refractive index of a glass part of the negative meniscus lens with respect to d ray; n22 is the refractive index of a biconcave lens with respect to d ray; and n23 is the refractive index of a positive lens with a convex surface opposing the object side.

The equation (1) mentioned above is a conditional equation defining the refractive index of glass lenses constituting the second lens group with respect to d ray.

As described above, in the zoom lens according to the present invention, by increasing the refractive index of glass lenses constituting the second lens group, the thickness of the second lens group is reduced. By setting the refractive index so as to satisfy the conditional equation (1), compatibility between the miniaturization and the offering high-performance is enabled.

In order to further reduce the lens diameter, the lower limit may be preferably 1.8.

In the zoom lens according to the present invention, in order to further preferably correct the change in coma generated in the wide angle end state corresponding to the change in angle of view, it is preferable that the following conditional equation (2) be satisfied:

$$0.25 < Rs/Da < 0.45, \quad (2)$$

where Rs is the radius of curvature of the lens surface nearest to the image side of the meniscus lens in the second lens group and Da is the distance from the above-mentioned lens surface in the wide angle end state to the aperture diaphragm.

The equation (2) mentioned above is a conditional equation defining the radius of curvature of the lens surface nearest to the image side of the compound lens arranged in the second lens group.

If Rs/Da is exceeding the upper limit of the equation (2), the off-axial luminous flux passing through the second lens group is separated from the optical axis too much, so that the lens diameter is difficult to be sufficiently reduced.

Conversely, if Rs/Da is less than the lower limit of the equation (2), the radius of curvature of the lens surface adjacent to the image side is reduced, so that the releasing between the die and the resin lens is deteriorated and the forming face of the resin lens is liable to be deteriorated. By such problems arisen during manufacturing, stable optical performances cannot be obtained.

In order to further reduce the lens diameter, the lower limit may be preferably 0.3.

In the zoom lens according to the present invention, in order to further reduce the lens diameter while the stable optical quality is secured despite the problems arisen during manufacturing, it is preferable that the following conditional equation (3) be satisfied:

$$0.7 < (R1-R2)/(R1+R2) < 0.9, \quad (3)$$

where R1 is the radius of curvature of the lens surface nearest to the object side of the negative meniscus lens arranged in the second lens group and R2 is the radius of curvature of the lens surface adjacent to the image side of glass lenses constituting the negative meniscus lens arranged in the second lens group.

The equation (3) mentioned above is a conditional equation defining the shape of the glass part of the compound lens arranged in the second lens group.

If (R1-R2)/(R1+R2) is exceeding the upper limit of the equation (3), the thickness difference between the central thickness and the peripheral thickness of the glass lens part is increased, so that the change in shape due to the heating during the molding is largely different between the central part and the peripheral part. Hence, the resin lens is formed on the concave surface of the glass lens being different in shape from that during room temperature, so that the shape of the lens surface of the resin lens is changed when returning the room temperature, thereby obtaining no predetermined optical performance.

If (R1-R2)/(R1+R2) is less than the lower limit of the equation (3), since the principal point of the second lens group is moved toward the image side, the off-axial luminous flux passing through the second lens group is separated from the optical axis, so that the lens diameter is not reduced sufficiently.

In the zoom lens according to the present invention, in order to further preferably correct the change in off-axial aberration generated in accordance with the change in lens position, it is preferable that the following conditional equation (4) be satisfied:

$$0.3 < |f2|/(fw \cdot ft)^{1/2} < 0.4, \quad (4)$$

where f2 is the focal length of the second lens group; fw is the focal length of the entire lens system in the wide angle end state; and ft is the focal length of the entire lens system in the telescopic end state.

The equation (4) mentioned above is a conditional equation defining the refracting power of the second lens group.

If $|f2|/(fw \cdot ft)^{1/2}$ is exceeding the upper limit of the equation (4), the displacement of the second lens group required for obtaining a predetermined variable power ratio is increased, so that the entire lens length is undesirably increased.

Conversely, $|f2|/(fw \cdot ft)^{1/2}$ is less than the lower limit of the equation (4), so that even if an aspheric surface is included in the negative meniscus lens, the off-axial aberration generated in accordance with the change in lens position is difficult to be suppressed.

In the zoom lens according to the present invention, using an aspheric lens in any of lens groups other than the second lens group, a higher optical performance can be achieved. In particular, by making the lens surface nearest to the object side of the third lens group aspheric, the central performance can be much more improved. Also, using an aspheric lens in the fourth lens group, the change in coma due to the angle of view in the telescopic end state can be corrected further preferably.

Further preferably, it is obvious that using a plurality of aspheric surfaces in addition to the aspheric surface used in the second lens group, a higher optical performance be achieved.

In the zoom lens according to the present invention, by shifting one lens group or part of one lens group in lens groups constituting a lens system in a direction approximately perpendicular to the optical axis, images can be also shifted. By combining a detection system for detecting a camera blur, a drive system for shifting the lens group, and a control system for applying a shift to the drive system corresponding to the output from the detection system, a vibration-proof optical system can be functioned.

In particular, according to the present invention, by shifting part of the third lens group or the entire thereof in a direction approximately perpendicular to the optical axis, images can be shifted with a small change in aberration. The reason is that the change in coma generated during being shifted is small because the third lens group is arranged in the vicinity of the aperture diaphragm, so that the off-axial luminous flux passes through the vicinity of the optical axis.

In the zoom lens according to the present invention, during short-range focusing, it is desirable to move one lens group of lens groups constituting a lens system, or part of one lens group.

It is preferable especially when the fourth lens group is moved because the short-range focusing can be performed using a small workload (=weight×displacement) as its lens diameter is small.

Also, in order to prevent Moire fringe, a low-pass filter may be arranged adjacent to the image side of the lens system, and an infra-red cutting filter may obviously be arranged in accordance with spectral sensitivity characteristics of a light-receiving element.

Embodiments of the zoom lens according to the present invention and numerical embodiments having numeric numbers incorporating the embodiments will be described below.

In each numerical embodiment, an aspheric sphere is expressed by following Numerical Formula 1.

[Numerical Formula 1]

where y is the height from the optical axis; x is the sag; c is the curvature; k is the conic constant; and c4 and c6 are aspheric factors.

FIG. 1 shows refracting power allocations in each embodiment of the zoom lens according to the present invention, in which a first lens group G1 having positive refracting power, a second lens group G2 having negative refracting power, a third lens group G3 having positive refracting power, and a fourth lens group G4 having positive refracting power arranged from the object side in that order. During the variation from the wide angle end state (state shown by line W of FIG. 1) to the telescopic end state (state shown by line T of FIG. 1), the air space between the first lens group G1 and the second lens group G2 is increased while the air space between the third lens group G3 and the fourth lens group G4, so that the second lens group G2 is moved toward the image side. At this time, the first and third lens groups are fixed and the fourth lens group G4 moves so as to compensate the fluctuation in image-surface position due to the shift of the second lens group.

In each embodiment, a protection glass is arranged nearest to the image side.

Figure 2:
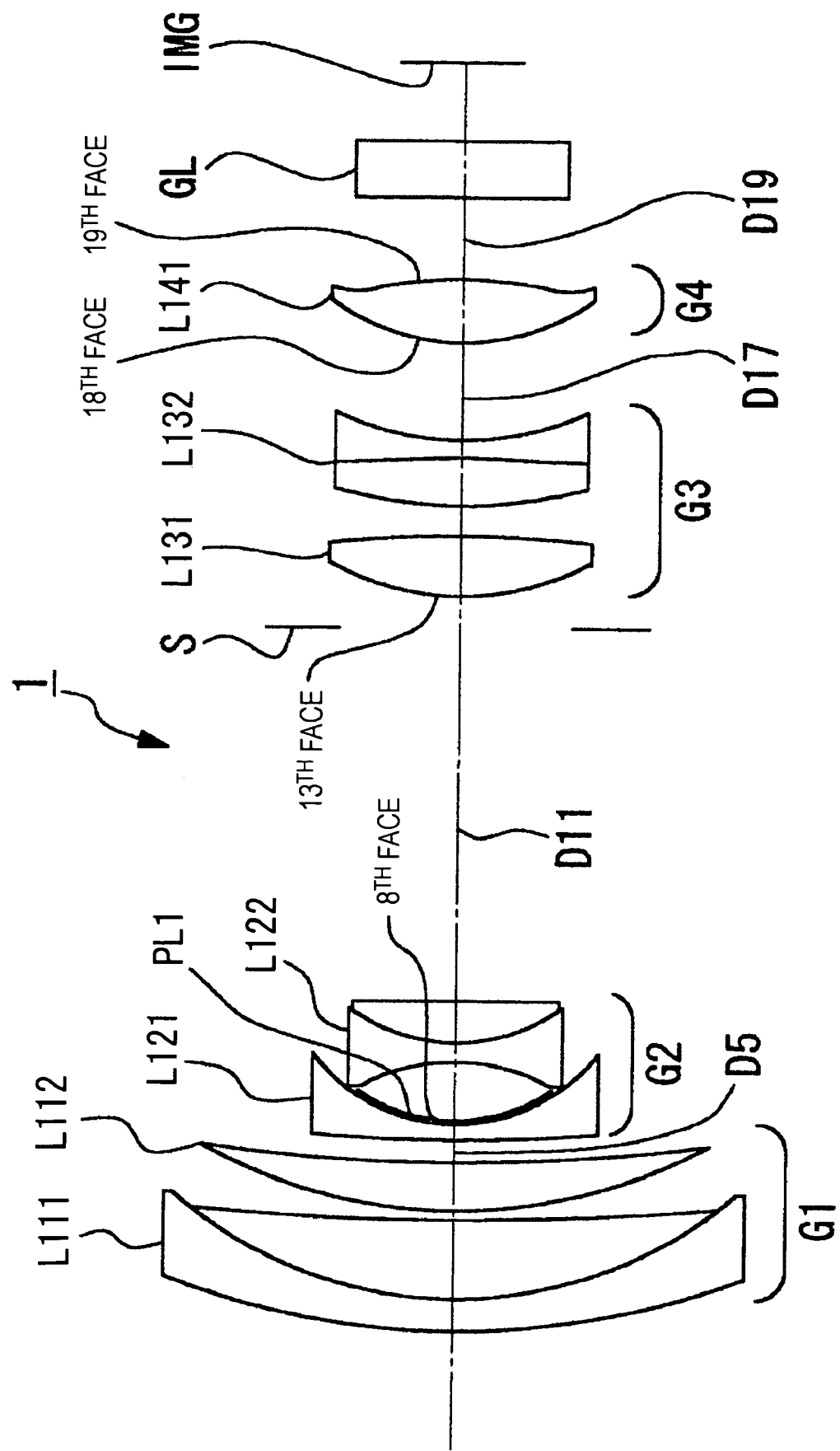
FIG. 2 is a drawing showing a lens configuration of a first embodiment of the zoom lens according to the present invention.

FIG. 2 shows a lens configuration according to a first embodiment 1 of the zoom lens according to the present invention, in which the first lens group G1 is composed of a cemented lens L111 of a meniscus negative lens with a convex surface opposing the object side and a positive lens with a convex surface opposing the object side and a positive lens L112 with a convex surface opposing the object side; the second lens group G2 is composed of a meniscus negative lens L121 with a concave surface opposing the image side and a cemented lens L122 of a biconcave negative lens and a positive lens with a convex surface opposing the object side; the third lens group G3 is composed of a biconvex positive lens L131 and a cemented lens L132 of a biconvex lens and a biconcave lens; and the fourth lens group G4 is composed of a positive lens L141 with a convex surface opposing the object side. The meniscus negative lens L121 of the second lens group G2 is a compound lens having a resin lens PL1 integrally formed on the image-side surface.

In the first embodiment 1, an aperture diaphragm S is arranged between the second lens group G2 and the third lens group G3, and the aperture diaphragm S is fixed during the changing of lens positions. A protection glass GL is arranged between the fourth lens group G4 and an image plane IMG.

Table 1 below shows data of a numerical embodiment 1 having numeric numbers incorporating the first embodiment 1. In data tables including Table 1, character f denotes a focal length; character FNO denotes an F number; character 2ω denotes an angle of view; and the refractive index is the value with respect to d ray (λ=587.6 nm). In data tables including Table 1, zero of the radius of curvature designates the plane.

[Table 1]

In the numerical embodiment 1, lens surfaces of $8^{th}$ face, $13^{th}$ face, $18^{th}$ face, and $19^{th}$ face are aspheric and aspheric factors are shown in Table 2.

[Table 2]

In the first embodiment 1, during the changing of lens positions, an axial interplanar space D5 between the first lens group G1 and the second lens group G2, an axial interplanar space D11 between the second lens group G2 and the aperture diaphragm S, an axial interplanar space G17 between the third lens group G3 and the fourth lens group G4, and an axial interplanar space D19 between the fourth lens group G4 and the protection glass GL are variable. Each variable axial interplanar space in the numerical embodiment 1 is shown in Table 3 with the focal length f.

[Table 3]

Table 4 below shows corresponding values to the conditional equations (1) to (4) in the numerical embodiment 1.

[Table 4]

Figure 3:
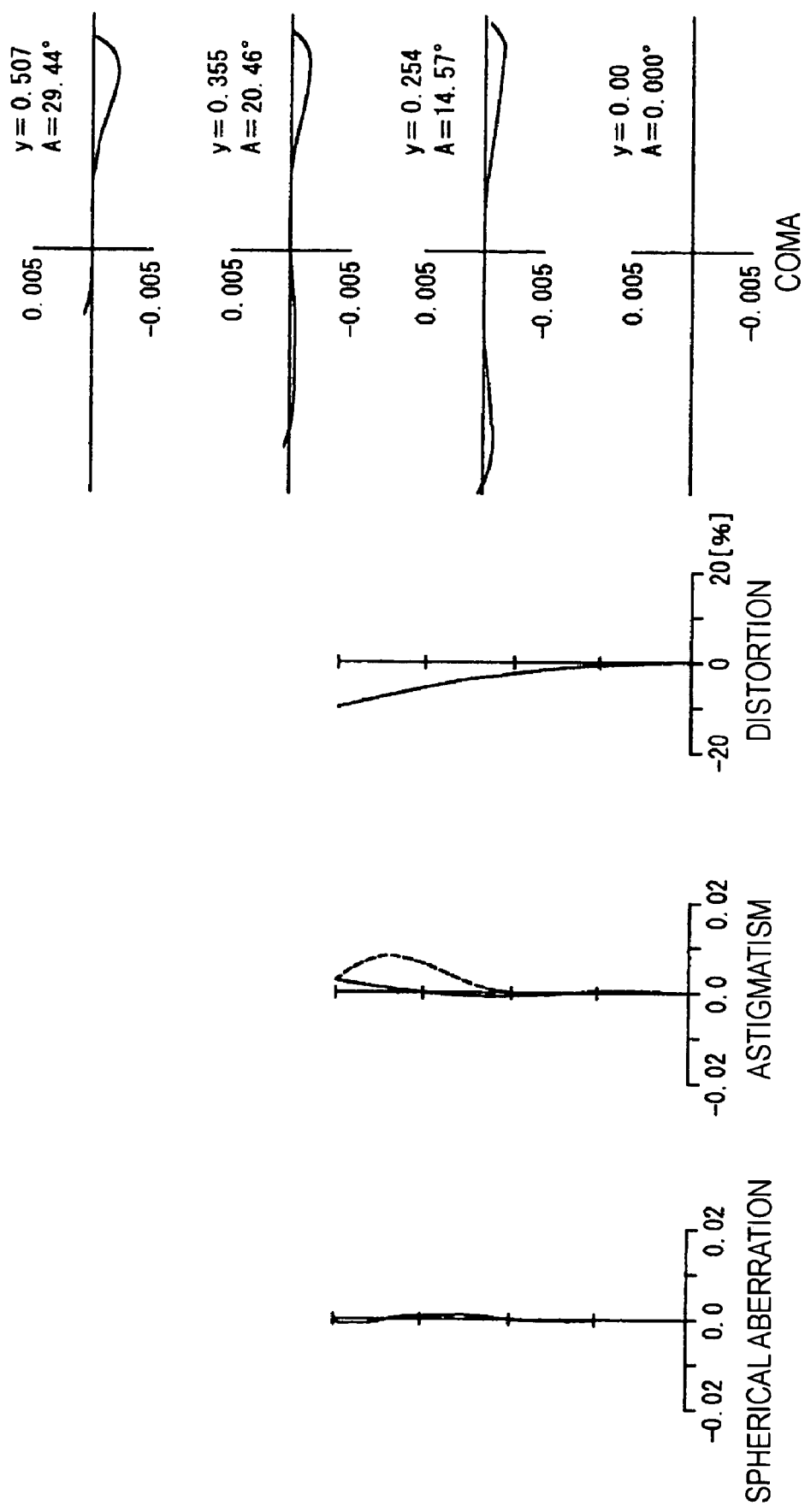
FIG. 3 shows every sort of aberration drawings in a numeric embodiment 1 having numeric numbers incorporating the first embodiment together with FIGS. 4 and 5, and this drawing shows the spherical aberration, astigmatism, distortion, and coma in a wide angle end state.
Figure 4:
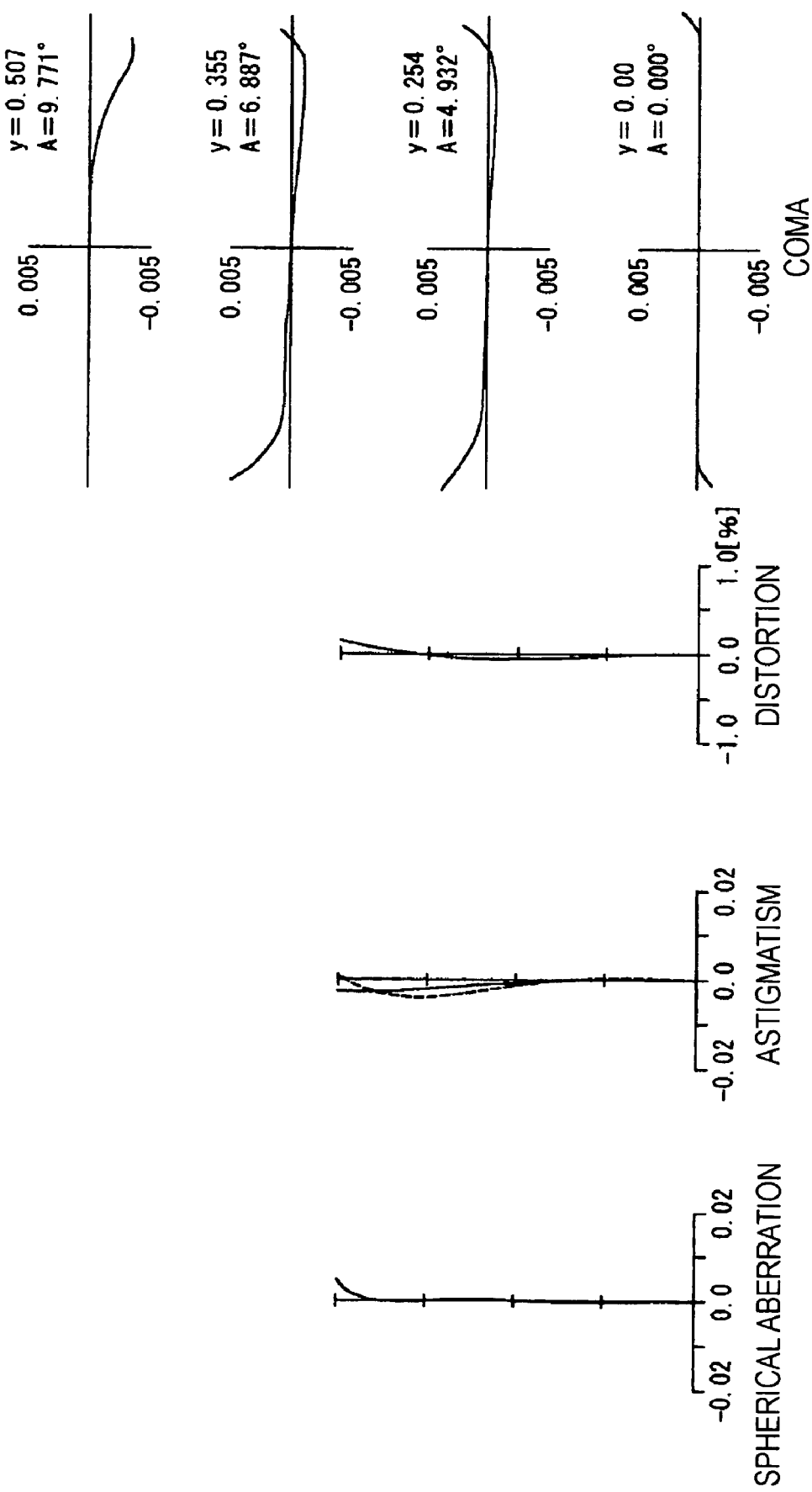
FIG. 4 shows the spherical aberration, astigmatism, distortion, and coma in an intermediate focal length state.
Figure 5:
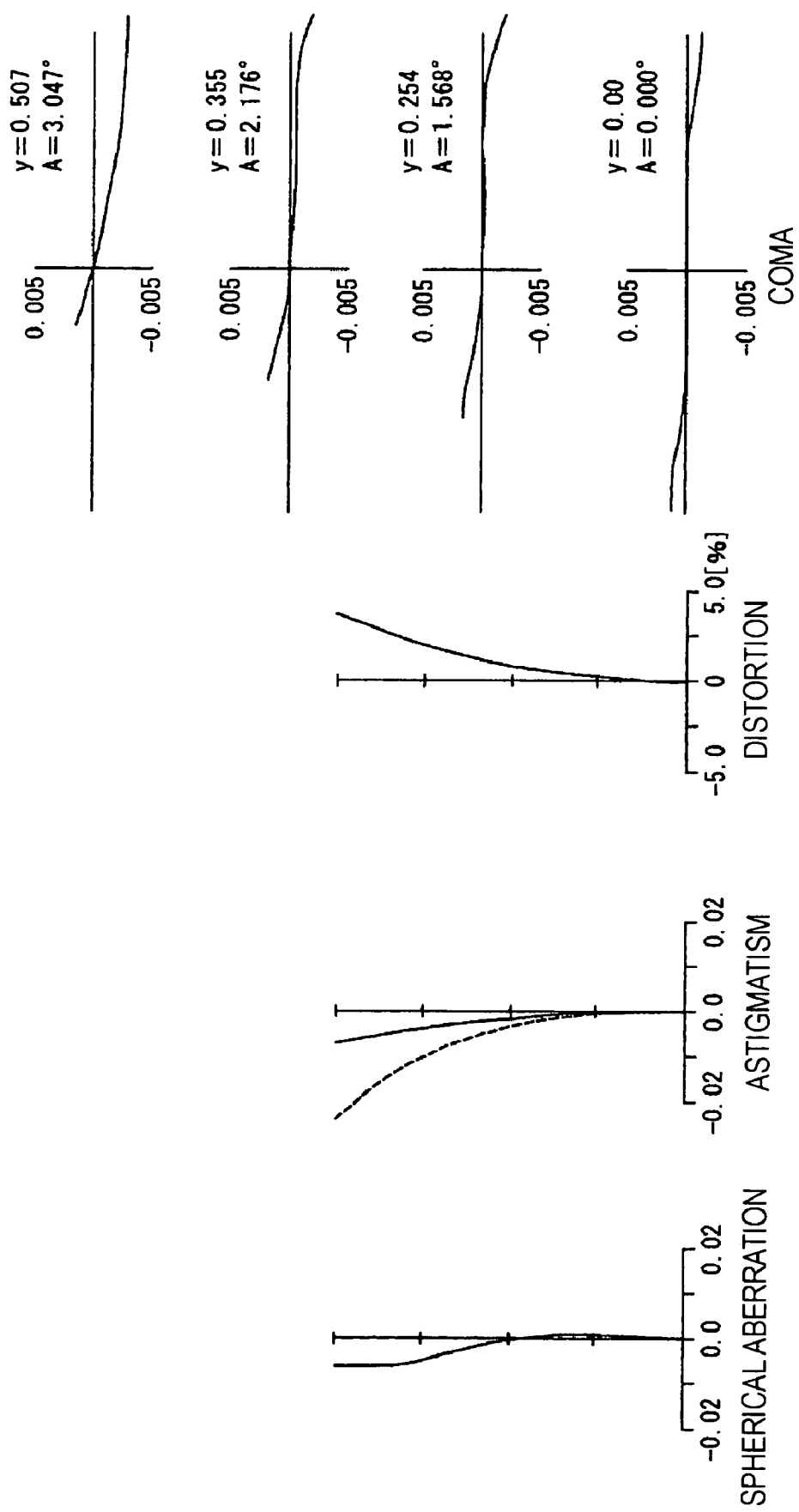
FIG. 5 shows the spherical aberration, astigmatism, distortion, and coma in a telescopic end state.

FIGS. 3 to 5 show aberrations in an infinite-distance focusing state in the numerical embodiment 1; FIG. 3 shows aberrations in the wide angle end state (f=1.000); FIG. 4 shows aberrations in an intermediate focal length state (f=2.942); and FIG. 5 shows aberrations in the telescopic end state (f=9.188).

In astigmatism drawings, the solid line shows a sagittal image surface and the broken line shows a meridional image surface. In coma drawings, comas in image-heights y=0, 0.254, 0.355, and 0.507 are shown, and character A denotes the angle of view.

From the aberration drawings, the numerical embodiment 1 apparently shows the aberrations are preferably corrected so as to have excellent focusing performances.

Figure 6:
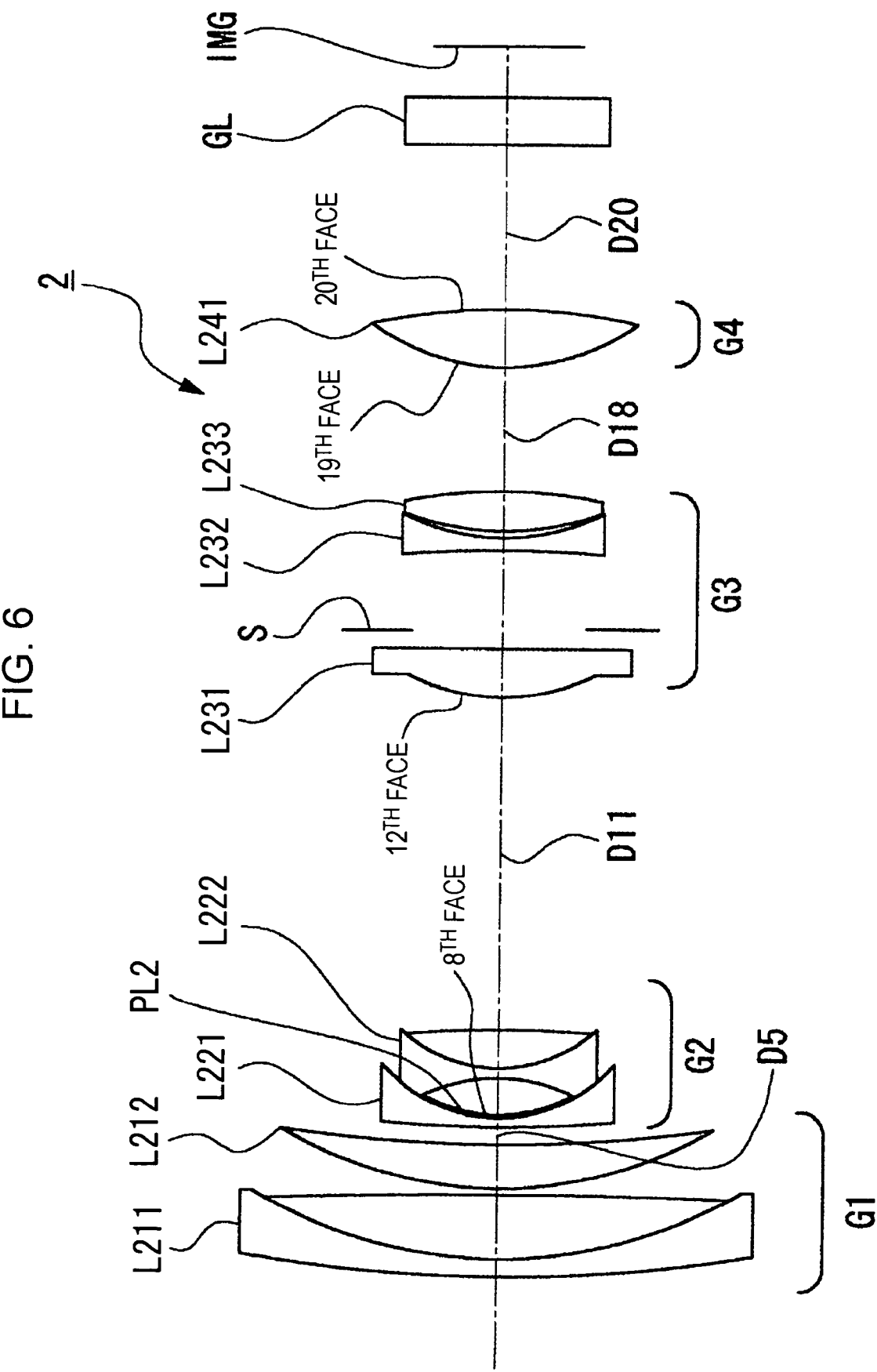
FIG. 6 is a drawing showing a lens configuration of a second embodiment of the zoom lens according to the present invention.

FIG. 6 shows a lens configuration according to a second embodiment 2 of the zoom lens according to the present invention, in which the first lens group G1 is composed of a cemented lens L211 of a meniscus negative lens with a convex surface opposing the object side and a positive lens with a convex surface opposing the object side and a positive lens L212 with a convex surface opposing the object side; the second lens group G2 is composed of a meniscus negative lens L221 with a concave surface opposing the image side and a cemented lens L222 of a biconcave negative lens and a positive lens with a convex surface opposing the object side; the third lens group G3 is composed of a biconvex positive lens L231 with a convex surface opposing the object side, a biconcave negative lens L232, and a biconvex positive lens L233; and the fourth lens group G4 is composed of a positive lens L241 with a convex surface opposing the object side. The meniscus negative lens L221 of the second lens group G2 is a compound lens having a resin lens PL2 integrally formed on the image-side surface.

In the second embodiment 2, the aperture diaphragm S is arranged between the positive lens L231 and the negative lens L232 in the third lens group G3, and the aperture diaphragm S is fixed during the changing of lens positions. The protection glass GL is arranged between the fourth lens group G4 and the image plane IMG.

Table 5 below shows data of a numerical embodiment 2 having numeric numbers incorporating the second embodiment 2.

[Table 5]

In the numerical embodiment 2, lens surfaces of $8^{th}$ face, $12^{th}$ face, $19^{th}$ face, and $20^{th}$ face are aspheric and aspheric factors are shown in Table 6.

[Table 6]

In the second embodiment 2, during the changing of lens positions, the axial interplanar space D5 between the first lens group G1 and the second lens group G2, the axial interplanar space D11 between the second lens group G2 and the third lens group G3, an axial interplanar space G18 between the third lens group G3 and the fourth lens group G4, and an axial interplanar space D20 between the fourth lens group G4 and the protection glass GL are variable. Each variable axial interplanar space in the numerical embodiment 2 is shown in Table 7 with the focal length f.

[Table 7]

Table 8 below shows corresponding values to the conditional equations (1) to (4) in the numerical embodiment 2.

[Table 8]

Figure 7:
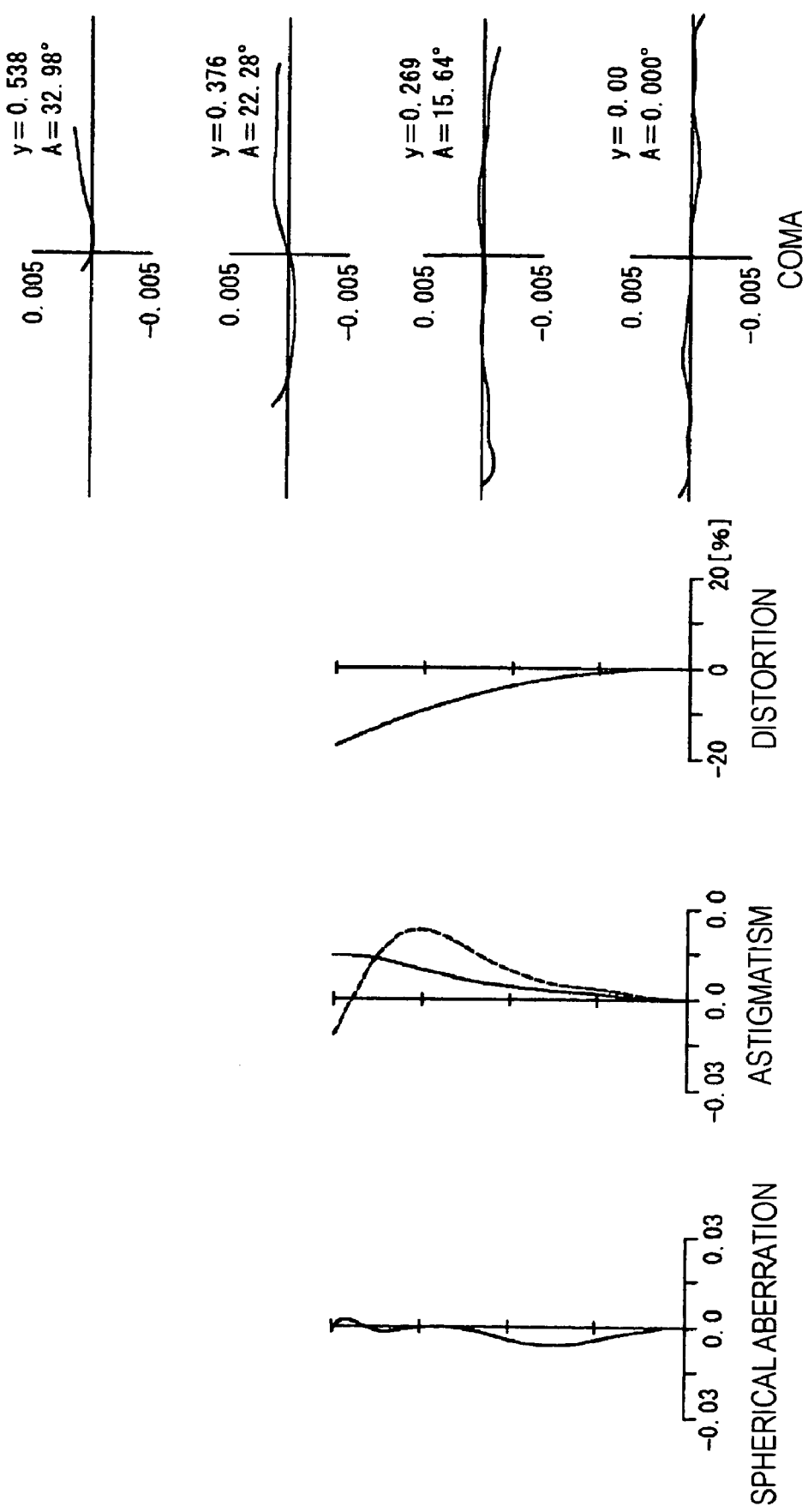
FIG. 7 shows every sort of aberration drawings in a numeric embodiment 2 having numeric numbers incorporating the second embodiment together with FIGS. 8 and 9, and this drawing shows the spherical aberration, astigmatism, distortion, and coma in the wide angle end state.
Figure 8:
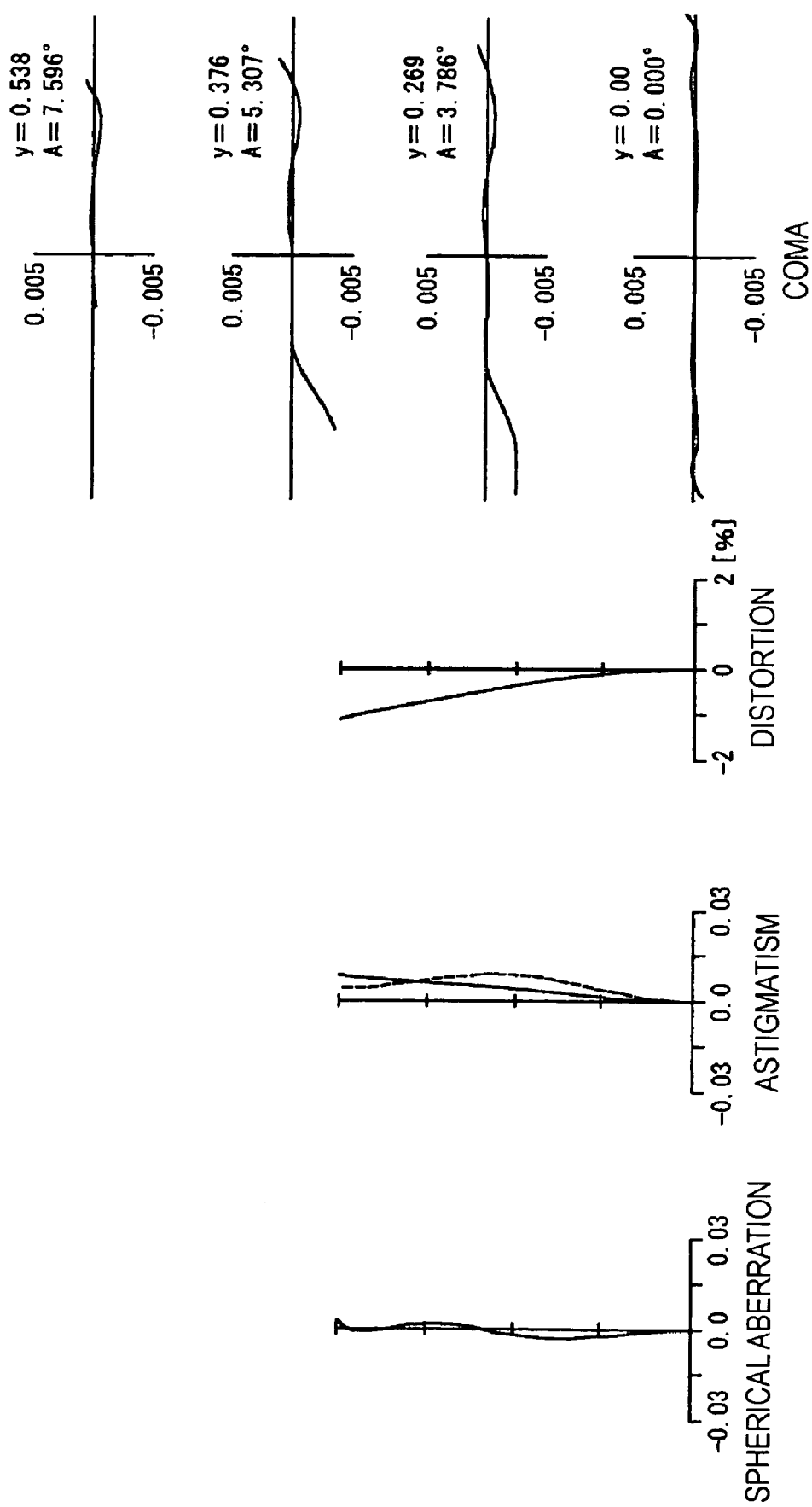
FIG. 8 shows the spherical aberration, astigmatism, distortion, and coma in an intermediate focal length state.
Figure 9:
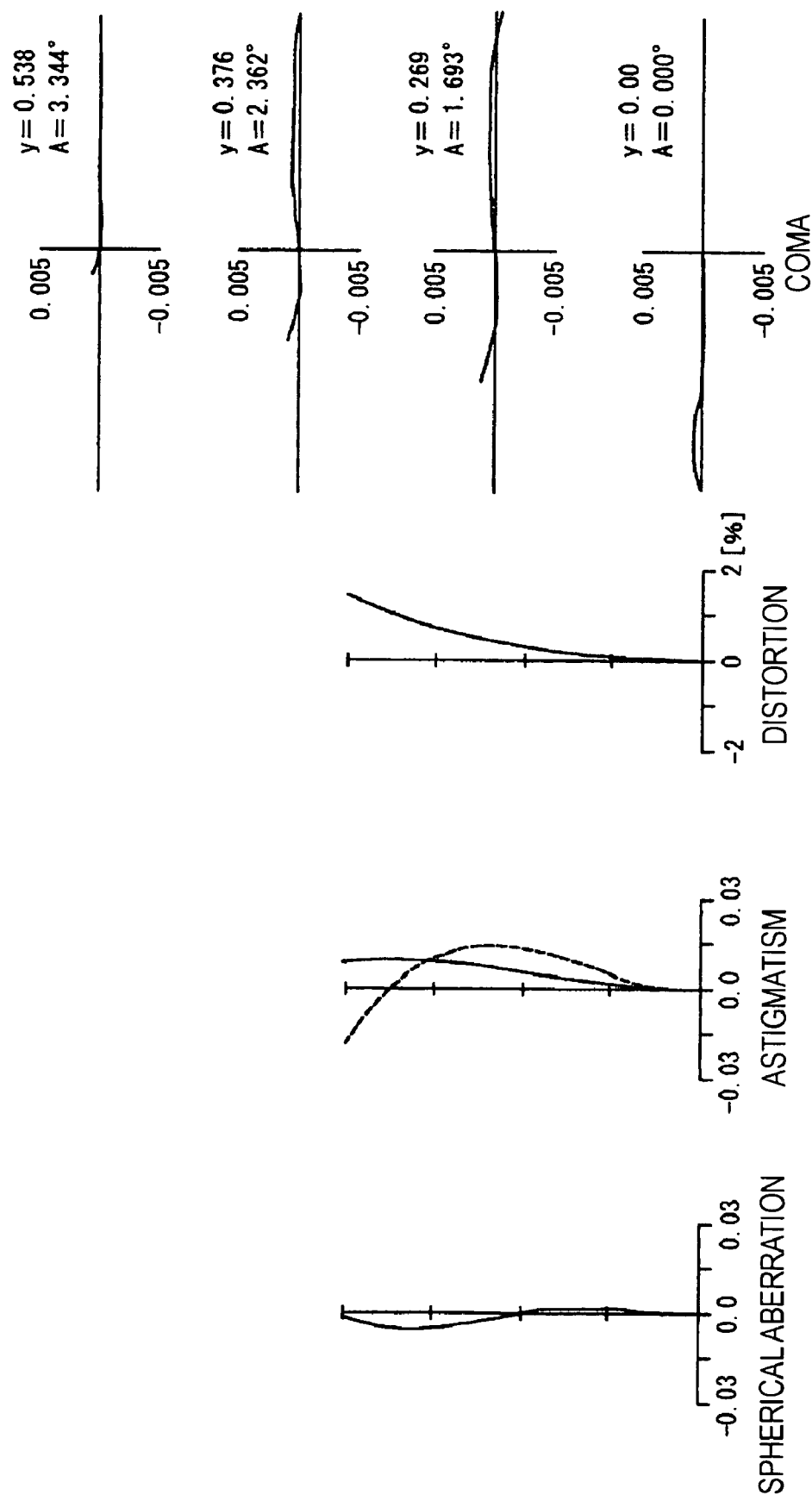
FIG. 9 shows the spherical aberration, astigmatism, distortion, and coma in the telescopic end state.

FIGS. 7 to 9 show aberrations in an infinite-distance focusing state in the numerical embodiment 2; FIG. 7 shows aberrations in the wide angle end state (f=1.000); FIG. 8 shows aberrations in an intermediate focal length state (f=4.077); and FIG. 9 shows aberrations in the telescopic end state (f=9.066).

In astigmatism drawings, the solid line shows a sagittal image surface and the broken line shows a meridional image surface. In coma drawings, comas in image-heights y=0, 0.269, 0.376, and 0.538 are shown, and character A denotes the angle of view.

From the aberration drawings, the numerical embodiment 2 apparently shows the aberrations are preferably corrected so as to have excellent focusing performances.

Figure 10:
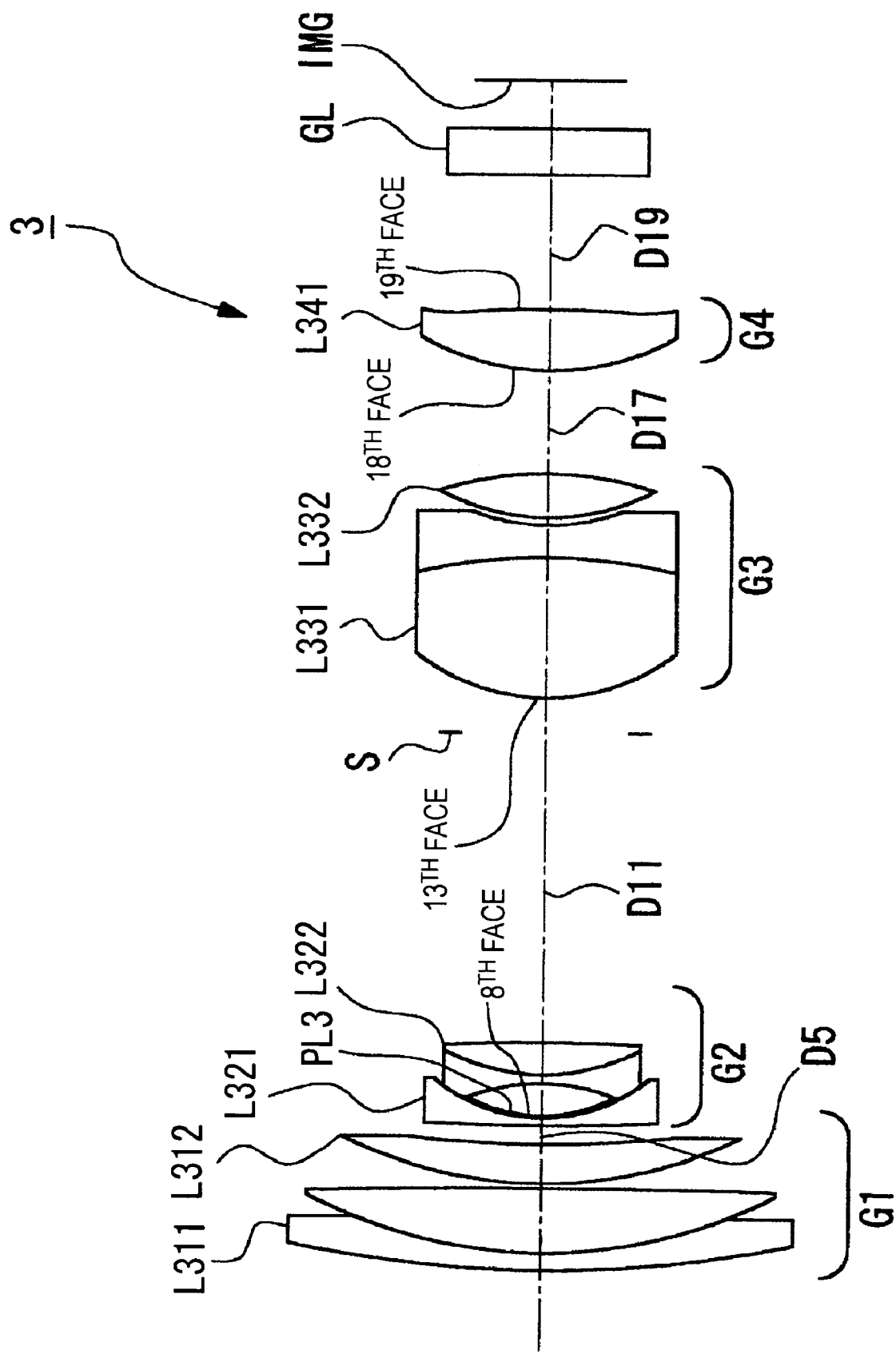
FIG. 10 is a drawing showing a lens configuration of a third embodiment of the zoom lens according to the present invention.

FIG. 10 shows a lens configuration according to a third embodiment 3 of the zoom lens according to the present invention, in which the first lens group G1 is composed of a cemented lens L311 of a meniscus negative lens with a convex surface opposing the object side and a positive lens with a convex surface opposing the object side and a positive lens L312 with a convex surface opposing the object side; the second lens group G2 is composed of a meniscus negative lens L321 with a concave surface opposing the image side and a cemented lens L322 of a biconcave negative lens and a positive lens with a convex surface opposing the object side; the third lens group G3 is composed of a cemented lens L331 of a positive lens with a convex surface opposing the object side and a negative lens with a convex surface opposing the image side and a positive lens L332 with a convex surface opposing the object side; and the fourth lens group G4 is composed of a positive lens L341 with a convex surface opposing the object side. The meniscus negative lens L321 of the second lens group G2 is a compound lens having a resin lens PL3 integrally formed on the image-side surface.

In the third embodiment 3, the aperture diaphragm S is arranged between the second lens group G2 and the third lens group G3, and the aperture diaphragm S is fixed during the changing of lens positions. The protection glass GL is arranged between the fourth lens group G4 and the image plane IMG.

Table 9 below shows data of a numerical embodiment 3 having numeric numbers incorporating the third embodiment 3.

[Table 9]

In the numerical embodiment 3, lens surfaces of $8^{th}$ face, $13^{th}$ face, $18^{th}$ face, and $19^{th}$ face are aspheric and aspheric factors are shown in Table 10.

[Table 10]

In the third embodiment 3, during the changing of lens positions, the axial interplanar space D5 between the first lens group G1 and the second lens group G2, the axial interplanar space D11 between the second lens group G2 and the aperture diaphragm S, the axial interplanar space G17 between the third lens group G3 and the fourth lens group G4, and an axial interplanar space D19 between the fourth lens group G4 and the protection glass GL are variable. Each variable axial interplanar space in the numerical embodiment 3 is shown in Table 11 with the focal length f.

[Table 11]

Table 12 below shows corresponding values to the conditional equations (1) to (4) in the numerical embodiment 3.

[Table 12]

Figure 11:
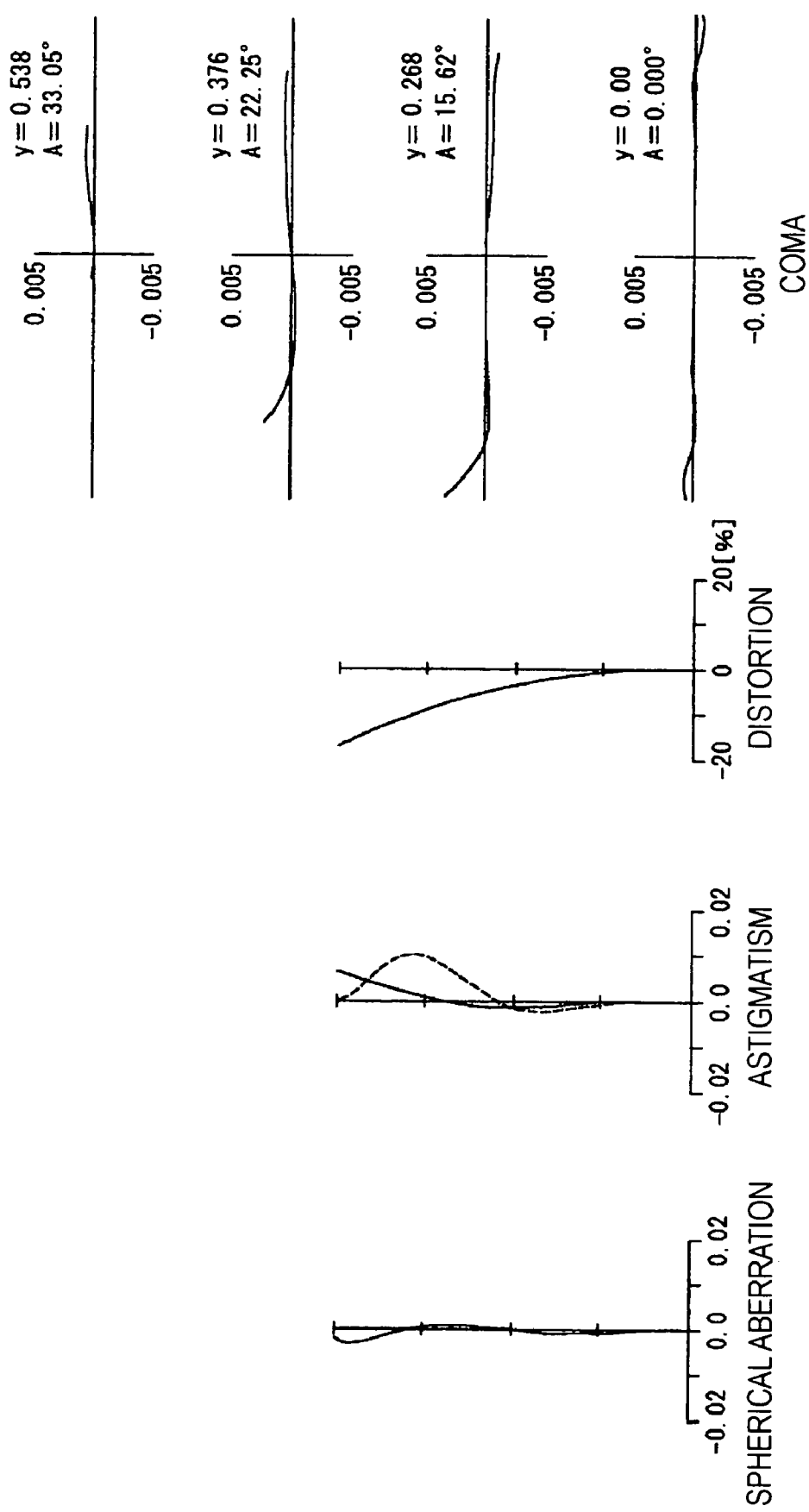
FIG. 11 shows every sort of aberration drawings in a numeric embodiment 3 having numeric numbers incorporating the third embodiment together with FIGS. 12 and 13, and this drawing shows the spherical aberration, astigmatism, distortion, and coma in the wide angle end state.
Figure 12:
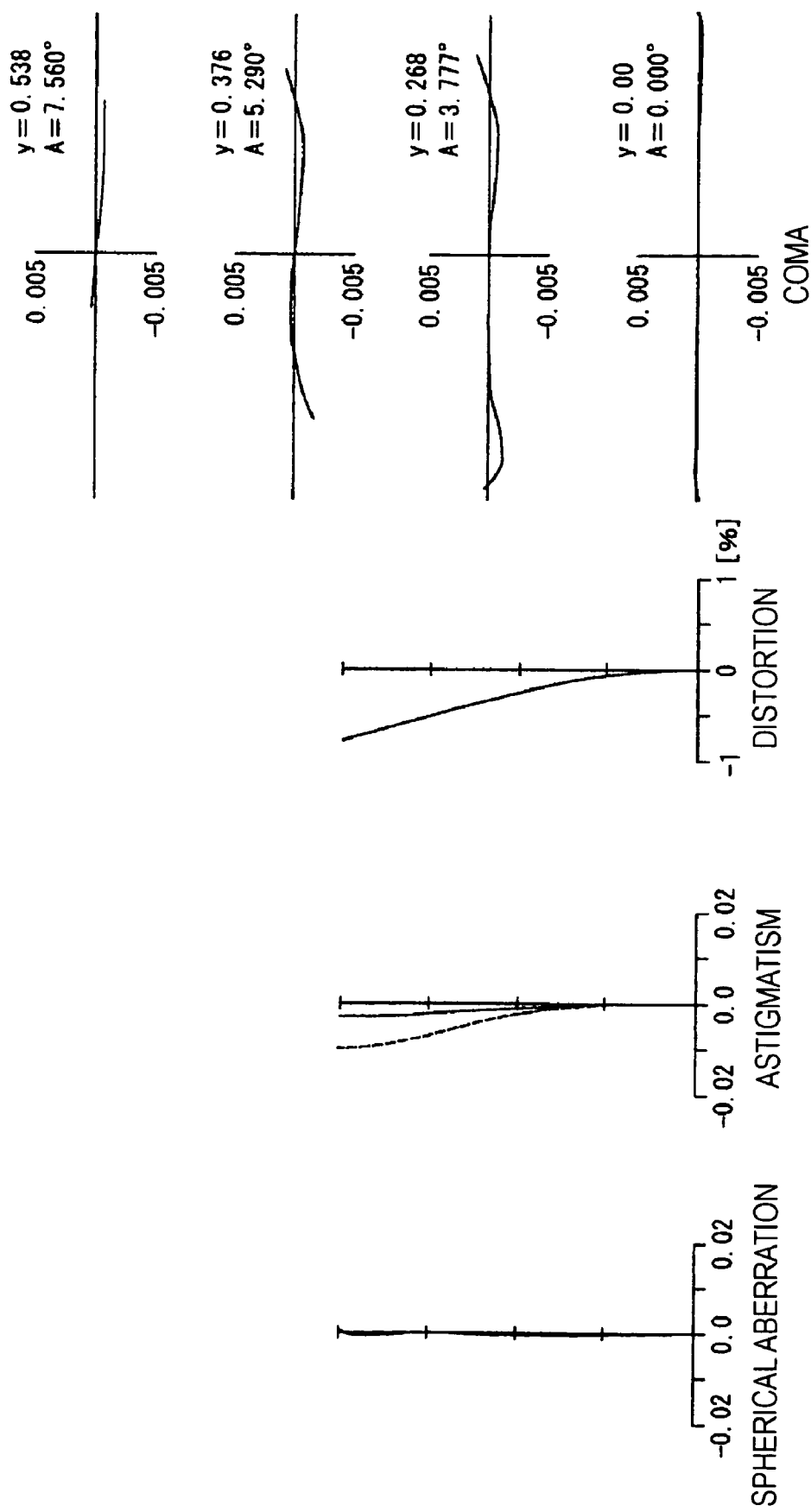
FIG. 12 shows the spherical aberration, astigmatism, distortion, and coma in an intermediate focal length state.
Figure 13:
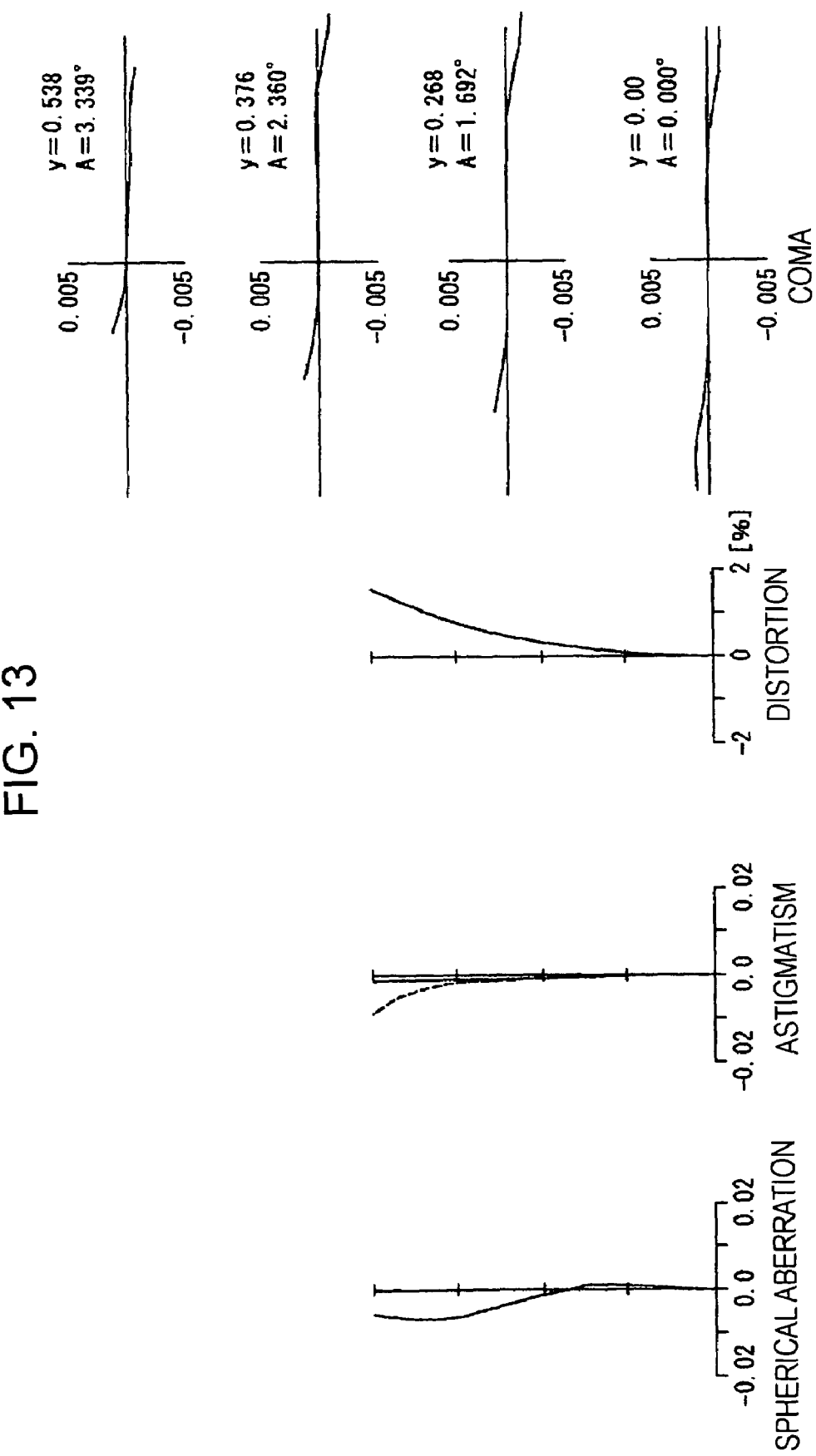
FIG. 13 shows the spherical aberration, astigmatism, distortion, and coma in the telescopic end state.

FIGS. 11 to 13 show aberrations in an infinite-distance focusing state in the numerical embodiment 3; FIG. 11 shows aberrations in the wide angle end state (f=1.000); FIG. 12 shows aberrations in an intermediate focal length state (f=4.077); and FIG. 13 shows aberrations in the telescopic end state (f=9.066).

In astigmatism drawings, the solid line shows a sagittal image surface and the broken line shows a meridional image surface. In coma drawings, comas in image-heights y=0, 0.268, 0.376, and 0.538 are shown, and character A denotes the angle of view.

From the aberration drawings, the numerical embodiment 3 apparently shows the aberrations are preferably corrected so as to have excellent focusing performances.

Figure 14:
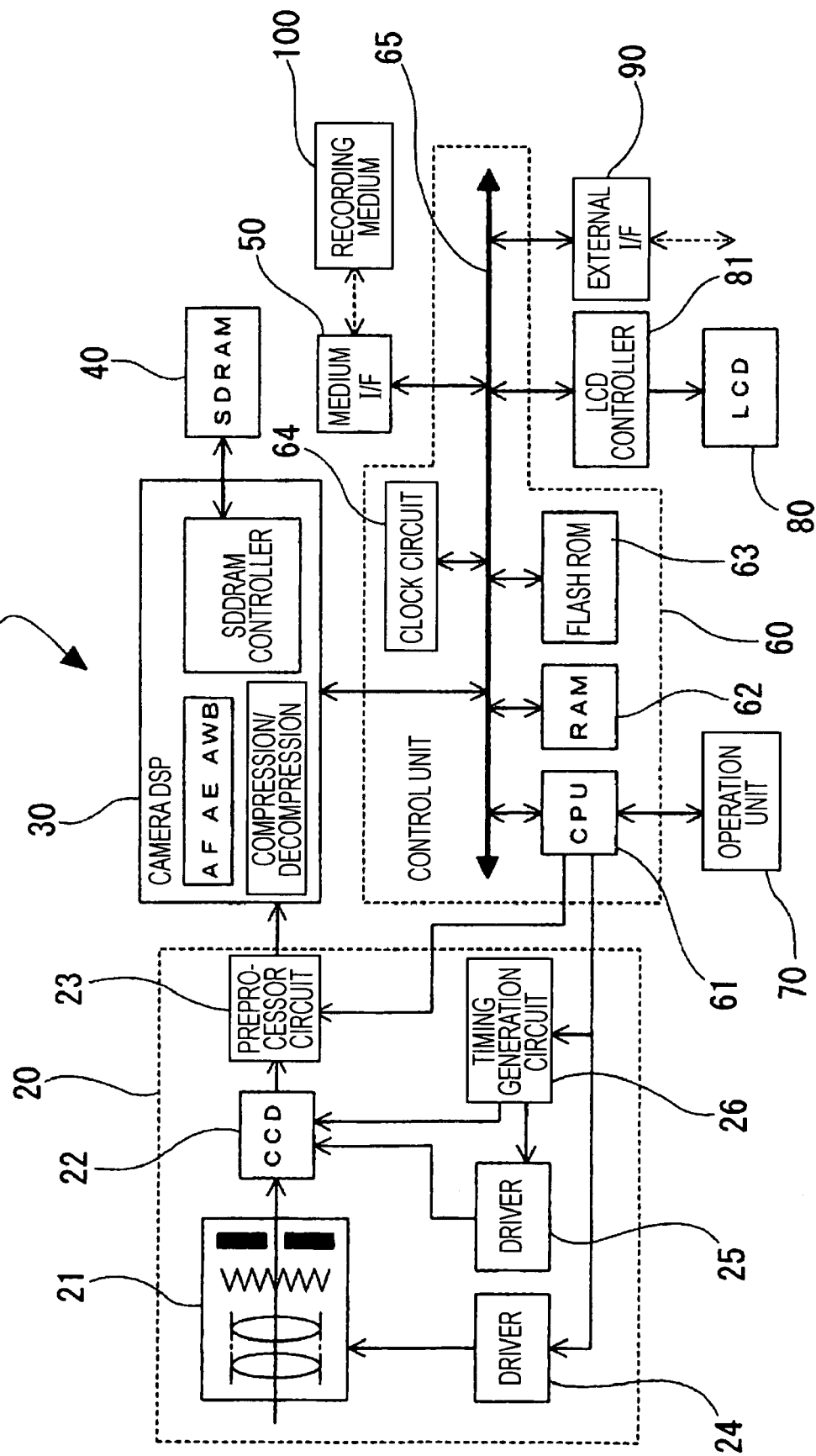
FIG. 14 is a block diagram of an embodiment of the image-pickup apparatus according to the present invention.

FIG. 14 shows an embodiment of an image-pickup apparatus according to the present invention.

An image-pickup apparatus 10 according to the embodiment, when roughly classified and as shown in FIG. 14, includes a camera part 20, a camera DSP (digital signal processor) 30, a SDRAM (synchronous dynamic random access memory) 40, a medium interface (referred to as a medium I/F below) 50, a control unit 60, an operation unit 70, an LCD (liquid crystal display) 80, and an external interface (referred to as an external I/F below) 90, as well as a recording medium 100 arranged detachably.

The recording medium 100 may use a so-called memory card using a semiconductor memory, an optical recording medium, such as a recordable DVD (digital versatile disk) and a recordable CD (compact discriminated), and a magnetic discriminated. According to the embodiment, the memory card is described to be used as the recording medium 100.

The camera part 20 includes an optical block 21, a CCD (charge coupled device) 22, a preprocessor circuit 23, a driver for the optical block 24, a driver for the CCD 25, and a timing generation circuit 26. The optical block 21 includes lenses, a focusing mechanism, a shutter mechanism, and a diaphragm (iris). The lenses in the optical block 21 use the zoom lenses 1, 2, and 3 according to the present invention. When forming color image information by overlapping the respective divided color images of R, G, and B introduced, a color separation prism and CCDs 22 for each of colors R, G, and B, which are divided by the color separation prism are inserted into between the lens group nearest to the image side and the image plane. In this case, a low-pass filter LPF may be inserted in immediately front (adjacent to the object side) of each CCD or adjacent to the object side of the color separation prism.

The control unit 60 is a micro-computer having a CPU (central processing unit) 61, an RAM (random access memory) 62, a clock circuit 64 connected together through a system bus 65 so as to control each unit of the image-pickup apparatus 10 according to the embodiment.

The RAM 62 is mainly used in an operation region for temporarily storing a partway result of the processing. The flush ROM 63 is for storing various programs executed in the CPU 61 and data required for processing. The clock circuit 64 can provide the present date, day of week, and time as well as a picturing day time.

During picking up images, the driver for the optical block 24 produces a drive signal for operating the optical block 21 corresponding to the control of the control unit 60 so as to feed it to the optical block 21 for operating the optical block 21. In the optical block 21, the focusing mechanism, the shutter mechanism, and the diaphragm are controlled by the drive signal from the driver for the optical block 24 so as to bring object images thereinto and supply them to the CCD 22.

The CCD 22 is for photo-electrically converting the images from the optical block 21 so as to be output, and operates in accordance with a drive signal from the driver for the CCD 25 so as to bring object images from the optical block 21 thereinto. Simultaneously, on the basis of a timing signal from the timing generation circuit 26 controlled by the control unit 60, the CCD 22 supplies the taken-in object images (image information) to the preprocessor circuit 23 as electric signals.

As described above, the timing generation circuit 26 produces a timing signal for supplying a predetermined timing corresponding to the control from the control unit 60. The driver for the CCD 25 produces a drive signal for supplying it to the CCD 22 on the basis to the timing signal from the timing generation circuit 26.

The preprocessor circuit 23 is for preferably maintaining an S/N ratio by performing CDS (correlated double sampling) on the electric image information supplied thereto; for controlling a gain by performing AGC (automatic gain control); and for producing digital image data by performing A/D (analog/digital) conversion.

The digital image data from the preprocessor circuit 23 are supplied to the camera DSP 30. The camera DSP 30 performs camera signal processing on the supplied image data, such as AF (auto focus), AE (auto exposure), and AWB (auto white balance). The image data modulated in such various ways are compressed by a predetermined compression system and supplied to the recording medium 100 mounted on the image-pickup apparatus 10 according to the embodiment via the system bus 65 and the medium I/F 50. The image data, as will be described later, are recorded in the recording medium 100 as a file.

The image data recorded on the recording medium 100 are read out from the recording medium 100 via the medium I/F 50 so as to supply objective image data to the camera DSP 30 in accordance with a user operation input received through the operation unit 70 including a touch panel and control keys.

The camera DSP 30 performs decompression (extension) on the compressed image data read out of the recording medium 100 and supplied via the medium I/F 50 so as to supply the decompressed image data to an LCD controller 81 via the system bus 65. The LCD controller 81 produces image signals from the supplied image data for supplying them to the LCD 80. Thereby, the images corresponding to the image data recorded on the recording medium 100 are displayed on the LCD 80.

The conformation of the image display corresponds to a display processing program recorded on an ROM. That is, the display processing program is a program of the recorded manner of a below mentioned file system and the image reproducing manner.

The image-pickup apparatus 10 according to the embodiment is provided with the external I/F 90. Through the external I/F 90, the image-pickup apparatus 10 may be connected to an external personal computer, for example, so as to have image data from the personal computer and record them on the own recording medium 100. Alternatively, the image data recorded on the own recording medium 100 may be supplied to an external personal computer.

By connecting a communication module to the external I/F 90, the image-pickup apparatus 10 may be connected to the internet, for example, so as to have various image data and other information through a network and record them on the own recording medium 100. Alternatively, the image data recorded on the own recording medium 100 may be fed to the objective other party through a network.

The image data information obtained through the external personal computer or the network and recorded on the recording medium may also be read out in the image-pickup apparatus according to the embodiment, as described above. Obviously, the information may be reproduced so as to display it on the LCD 80 for use by a user.

In addition, the external I/F 90 may also include a wired interface, such as IEEE (institute of electrical and electronics engineers) 1394, and a USB (universal serial bus), and an optical or radio wave wireless interface. Namely, the external I/F 90 may be wired or wireless.

In such a manner, in the image-pickup apparatus 10 according to the embodiment, object images are picked up and recorded on the recording medium 100 mounted on the image-pickup apparatus 10 while the image data recorded on the recording medium 100 are read out so as to reproduce them for use. Also, image data supplied through an external personal computer or a network may be recorded on the recording medium 100 mounted on the image-pickup apparatus 10, or may be read out and reproduced.

In the image-pickup apparatus 10, the CCD is incorporated as image-picking up means; however, the image-picking up means in the image-pickup apparatus according to the present invention is not limited to the CCD, so that in addition to the CCD, other image-pickup elements such as a CMOS (complementary metal-oxide semiconductor) may also be used.

Specific shapes, structures, and numeric values of components in the embodiments and numeric embodiments described above are only examples in carrying out the invention, so that the technical scope of the present invention cannot be construed as limited to these.

INDUSTRIAL APPLICABILITY

A zoom lens and an image-pickup apparatus using the zoom lens are provided for use widely in digital video cameras and digital still cameras.

The invention claimed is:
1. A zoom lens comprising:
a first lens group having positive refracting power;
a second lens group having negative refracting power;
a third lens group having positive refracting power; and
a fourth lens group having positive refracting power, which are arranged from an object side in that order,
wherein during variation in lens position from a wide angle end state to a telescopic end state, the first and third lens groups are fixed at predetermined positions along the optical axis, the second lens group is moved toward an image side, and the fourth lens group moves so as to compensate fluctuations in image-surface position due to the shift of the second lens group,
wherein an aperture diaphragm is arranged adjacent to the object side of the third lens group or within the third lens group, and is fixed in the optical axial direction during the variation in lens position, wherein the second lens group includes a negative meniscus lens with a concave surface opposing the image side and a cemented lens of a biconcave lens and a positive lens with a convex surface opposing the object side, which are arranged from the object side in that order, and the negative meniscus lens is made of a compound lens of a glass lens and a resin lens formed adjacent to the image side of the glass lens, the lens surface adjacent to the image side of the resin lens being aspheric, wherein the following conditional equation (1) is satisfied:

$$n2 < 1.75, \tag{1}$$

wherein n2 is the average refractive index of glass lenses constituting the second lens group with respect to d ray, and wherein the following conditional equation (2) is satisfied:

$$0.3 < |f2|/\sqrt{(fw \cdot ft)} < 0.4, \tag{2}$$

where f2 is the focal length of the second lens group; fw is the focal length of the entire lens system in the wide angle end state; and ft is the focal length of the entire lens system in the telescopic end state.

2. The lens according to claim 1, wherein the following conditional equation (3) is satisfied:

$$0.25 < Rs/Da < 0.45, \tag{3}$$

where Rs is the radius of curvature of the lens surface nearest to the image side of the meniscus lens in the second lens group and Da is the distance from the lens surface Rs in the wide angle end state to the aperture diaphragm.

3. The lens according to claim 1, wherein the following conditional equation (4) is satisfied:

$$0.7 < (R1 - R2)/(R1 + R2) < 0.9, \tag{4}$$

where R1 is the radius of curvature of the lens surface nearest to the object side of the negative meniscus lens arranged in the second lens group and R2 is the radius of curvature of the lens surface adjacent to the image side of glass lenses constituting the negative meniscus lens arranged in the second lens group.

4. An image-pickup apparatus comprising:

a zoom lens; and an image-pickup element for converting optical images formed by the zoom lens into electric signals, wherein the zoom lens includes a first lens group having positive refracting power; a second lens group having negative refracting power; a third lens group having positive refracting power; and a fourth lens group having positive refracting power, which are arranged from an object side in that order, wherein during variation in lens position from a wide angle end state to a telescopic end state, the first and third lens groups are fixed at predetermined positions along the optical axis, the second lens group is moved toward an image side, and the fourth lens group moves so as to compensate fluctuations in image-surface position due to the shift of the second lens group, wherein an aperture diaphragm is arranged adjacent to the object side of the third lens group or within the third lens group, and is fixed in the optical axial direction during the variation in lens position, wherein the second lens group includes a negative meniscus lens with a concave surface opposing the image side and a cemented lens of a biconcave lens and a positive lens with a convex surface opposing the object side, which are arranged from the object side in that order, and the negative meniscus lens is made of a compound lens of a glass lens and a resin lens formed adjacent to the image side of the glass lens, the lens surface adjacent to the image side of the resin lens being aspheric, wherein the following conditional equation (1) is satisfied:

$$n2 > 1.75, \tag{1}$$

where n2 is the average refractive index of glass lenses constituting the second lens group with respect to d ray, and wherein the following conditional equation (2) is satisfied:

$$0.3 < |f2|/\sqrt{(fw \cdot ft)} < 0.4, \tag{2}$$

where f2 is the focal length of the second lens group: fw is the focal length of the entire lens system in the wide angle end state: and ft is the focal length of the entire lens system in the telescopic end state.

5. The apparatus according to claim 4, wherein the following conditional equation (3) is satisfied:

$$0.25 < Rs/Da < 0.45, \tag{3}$$

where Rs is the radius of curvature of the lens surface nearest to the image side of the meniscus lens in the second lens group and Da is the distance from the lens surface Rs in the wide angle end state to the aperture diaphragm.

6. The apparatus according to claim 4, wherein the Following conditional equation (4) is satisfied:

$$0.7 < (R1 - R2)/(R1 + R2) < 0.9, \tag{4}$$

where R1 is the radius of curvature of the lens surface nearest to the object side of the negative meniscus lens arranged in the second lens group and R2 is the radius of curvature of the lens surface adjacent to the image side of glass lenses constituting the negative meniscus lens arranged in the second lens group.

* * * * *